US010750765B2

(12) United States Patent
Yamamoto

(10) Patent No.: US 10,750,765 B2
(45) Date of Patent: Aug. 25, 2020

(54) DESALINIZATION DEVICE AND METHOD FOR PRODUCING DESALINIZED OBJECT

(71) Applicant: Freeze Food Development Co., Ltd., Kashiwazaki-shi (JP)

(72) Inventor: Hiroshi Yamamoto, Tokyo (JP)

(73) Assignee: Freeze Food Development Co., Ltd. (JP)

( * ) Notice: Subject to any disclaimer, the term of this patent is extended or adjusted under 35 U.S.C. 154(b) by 0 days.

(21) Appl. No.: 16/325,024

(22) PCT Filed: Jan. 30, 2017

(86) PCT No.: PCT/JP2017/003198
§ 371 (c)(1),
(2) Date: Feb. 12, 2019

(87) PCT Pub. No.: WO2018/034012
PCT Pub. Date: Feb. 22, 2018

(65) Prior Publication Data
US 2019/0183154 A1 Jun. 20, 2019

(30) Foreign Application Priority Data
Aug. 18, 2016 (JP) .................................. 2016-160585

(51) Int. Cl.
*A23L 5/20* (2016.01)
*C02F 1/44* (2006.01)
*C02F 1/469* (2006.01)

(52) U.S. Cl.
CPC .................. *A23L 5/20* (2016.08); *C02F 1/44* (2013.01); *C02F 1/4693* (2013.01)

(58) Field of Classification Search
CPC ...................................... A23L 5/20; C02F 1/44
See application file for complete search history.

(56) References Cited

U.S. PATENT DOCUMENTS

2018/0257964 A1* 9/2018 Green ..................... C02F 1/441

FOREIGN PATENT DOCUMENTS

| JP | H01271764 A | 10/1989 |
| JP | H04271764 A | 9/1992 |
| JP | 690685 A | 4/1994 |
| JP | 2002307033 A | 10/2002 |
| JP | 2002345430 A | 12/2002 |
| JP | 2008136435 A | 6/2008 |
| JP | 201162172 A | 3/2011 |

OTHER PUBLICATIONS

International Search Report, PCT/JP2017/003198, dated Feb. 28, 2017, 3 pgs.
RAN, Kansai Society of Naval Architects, 2003, 58, pp. 1-5 (cited in attached Japanese OA).

* cited by examiner

*Primary Examiner* — Brian A McCaig
(74) *Attorney, Agent, or Firm* — The Webb Law Firm

(57) ABSTRACT

A desalinization device includes a separating unit that is configured to separate an object including moisture into the moisture and a substance other than the moisture, a desalinizing unit that is configured to generate desalinized water obtained by removing salinity from the moisture separated by the separating unit, and a mixing unit that is configured to generate a desalinized object, by mixing the substance separated by the separating unit with the desalinized water generated by the desalinizing unit.

1 Claim, 3 Drawing Sheets

DESALINIZATION DEVICE AND METHOD FOR PRODUCING DESALINIZED OBJECT

CROSS-REFERENCE TO RELATED APPLICATIONS

This application is the United States national phase of International Application No. PCT/JP2017/003198 filed Jan. 30, 2017, and claims priority to Japanese Patent Application No. 2016-160585 filed Aug. 18, 2016, the disclosure of each of which is hereby incorporated by reference in its entirety.

TECHNICAL FIELD

The present invention relates to a desalinization device, and a method for producing a desalinized object.

BACKGROUND

Salt (sodium chloride) is used for seasoning or processing of food and drink. Sodium and potassium which are configuration ingredients of the salt are basic nutrients of the human body.

However, there is a case where excess ingestion of sodium becomes a cause of health problems of a heart disease and a vascular disease, such as high blood pressure. It is preferable that an aged person who is particularly likely to contract the disease described above reduces an ingestion amount of sodium.

Here, in order to reduce the ingestion amount of sodium, there is a need to ingest food and drink of which a used amount of the salt is reduced in the seasoning or the processing for a target person to ingest the food and drink.

On the other hand, in a case where an amount of the salt which is included in the food and drink is reduced, a taste of the food and drink may be spoiled. Here, for example, the taste of the food and drink is a delicious taste or a flavor.

In recent years, in order to reduce the ingestion amount of sodium without spoiling the delicious taste or the flavor of food or drink, a method for using a substance (referred to as a salt replacement substance, hereinafter) which is different from the salt, and has a salt taste (for example, Japanese Unexamined Patient Application, First Publication No. 2002-345430), a method for using a substance (referred to as a salt taste strengthening substance, hereinafter) which strengthens the salt taste when the substance coexists with the salt (for example, Japanese Unexamined Patient Application, First Publication No. 2011-62172), and the like are known.

SUMMARY OF INVENTION

However, in the technology disclosed in Japanese Unexamined Patent Application, First Publication No. 2002-345430 and Japanese Unexamined Patent Application, First Publication No. 2011-62172, a target person, to ingest food and drink for which that technology is used, demands ingestion of additives such as a food replacement substance in replacement of the salt and the salt taste strengthening substance. Here, there is a case where it is considered not to be preferable that the target person ingests the additive.

The present invention is made in view of the problems described above, and an object thereof is to provide a mechanism for generating a desalinized object obtained by removing salinity from an object.

According to an aspect of the present invention, there is provided a desalinization device including a separating unit that is configured to separate an object including moisture into the moisture and a substance other than the moisture, a desalinizing unit that is configured to generate desalinized water obtained by removing salinity from the moisture separated by the separating unit, and a mixing unit that is configured to generate a desalinized object, by mixing the substance separated by the separating unit with the desalinized water generated by the desalinizing unit.

In the desalinization device according to the aspect of the present invention, the desalinizing unit is configured to generate the desalinized water, by removing at least sodium from the moisture.

According to another aspect of the present invention, there is provided a method for producing a desalinized object including a separating step of separating an object including moisture into the moisture and a substance other than the moisture, a desalinizing step of generating desalinized water obtained by removing salinity from the moisture separated in the separating step, and a mixing step of generating the desalinized object, by mixing the substance separated in the separating step with the desalinized water generated in the desalinizing step.

According to the present invention, it is possible to provide a mechanism for generating a desalinized object obtained by removing salinity from an object.

DETAILED DESCRIPTION OF EMBODIMENTS

Hereinafter, an embodiment of the present invention will be described with reference to drawings.

Figure 1:
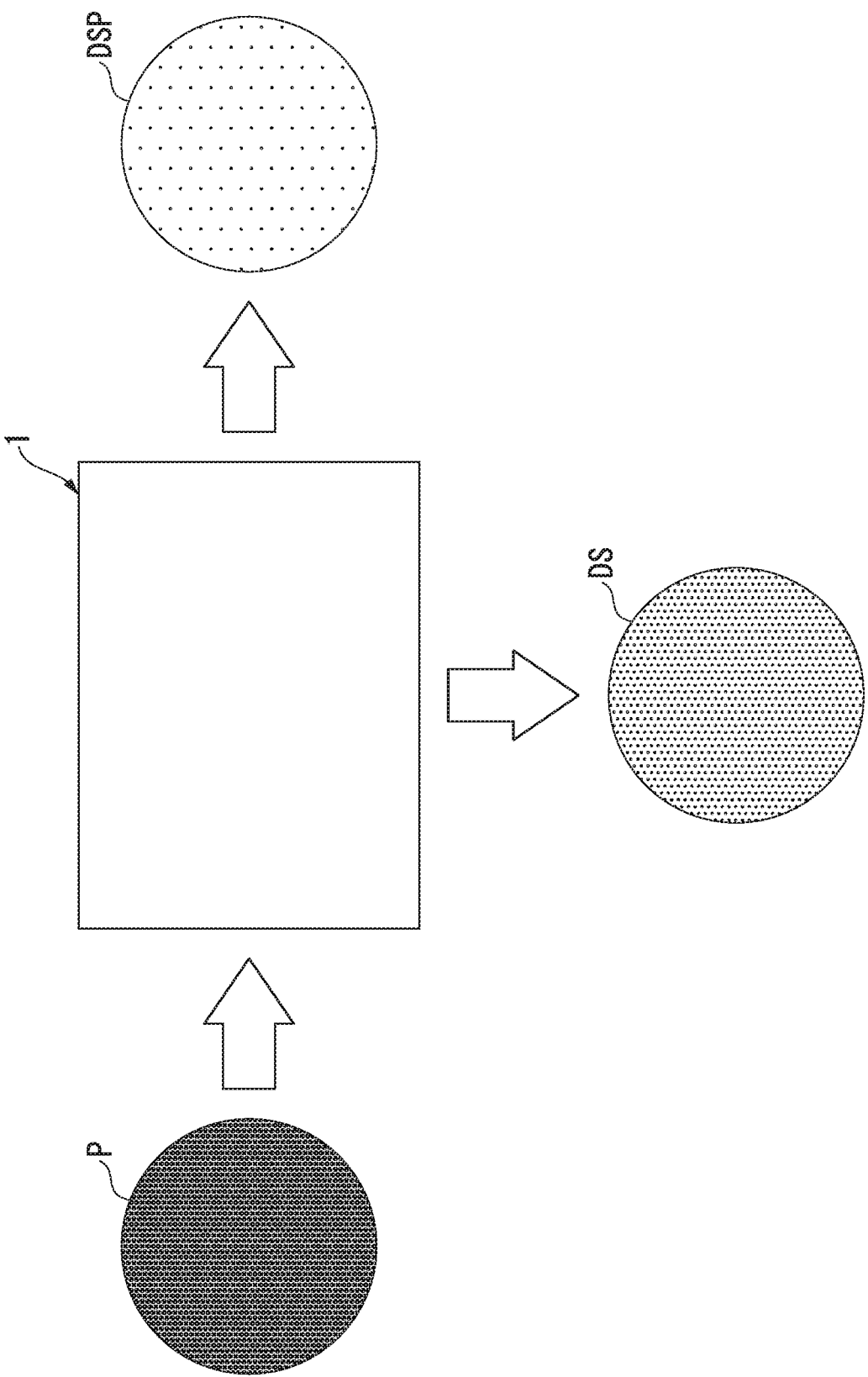
FIG. 1 is a diagram showing an outline of a desalinization device according to a present embodiment.

FIG. 1 is a diagram showing an outline of a desalinization device 1 according to the present embodiment.

The desalinization device 1 performs desalinization processing for removing salinity DS included in an object P. The object P is a substance from which a portion or all of the salinity DS is removed by the desalinization device 1, and is the substance including moisture M. For example, the object P is food or drink such as miso, soy sauce, consommé, Chinese soup, soup stock, sauce, noodle soup, various Japanese dipping sauces, seasonings, or soups. The salinity DS includes at least sodium. Specifically, the salinity DS is salt including sodium and potassium.

The desalinization device 1 performs the desalinization processing with respect to the object P, and generates a desalinized object DSP. The desalinized object DSP is a substance obtained by removing a portion or all of the salinity DS that is included in the object P, from the object P.

Hereinafter, a configuration of the desalinization device 1 will be described with reference to FIG. 2.

Figure 2:
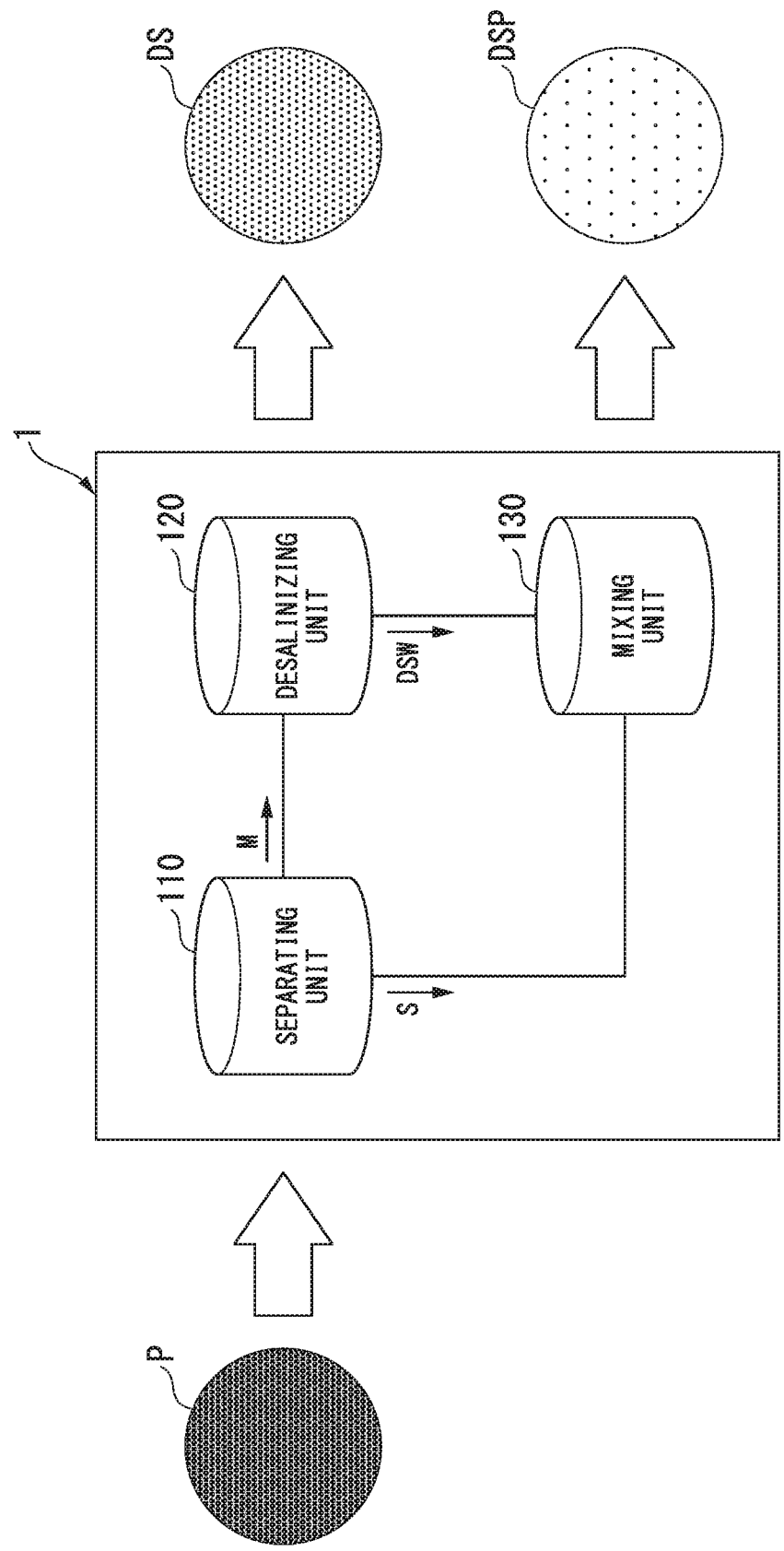
FIG. 2 is a diagram showing an example of a configuration of the desalinization device according to the present embodiment.

FIG. 2 is a diagram showing an example of the configuration of the desalinization device 1 according to the present embodiment.

As shown in FIG. 2, the desalinization device 1 includes a separating unit 110, a desalinizing unit 120, and a mixing unit 130.

The separating unit 110 separates the object P into the moisture M which is included in the object P, and a substance S other than the moisture M. For example, the separating unit 110 is a centrifugal separator, a centrifugal dehydrator, or the like. The separating unit 110 separates the object P into the moisture M and the substance S, supplies the moisture M to the desalinizing unit 120, and supplies the substance S to the mixing unit 130.

The moisture M is supplied to the desalinizing unit 120 from the separating unit 110. The desalinizing unit 120 removes the salinity DS which is included in the moisture M, from the moisture M. For example, the desalinizing unit 120 is an electrodialysis device including an ion exchange membrane. Specifically, the desalinizing unit 120 removes sodium from the moisture M. The desalinizing unit 120 generates desalinized water DSW obtained by removing the salinity DS from the moisture M. The desalinizing unit 120 supplies the desalinized water DSW which is generated to the mixing unit 130.

In the above description, a case where the desalinizing unit 120 removes sodium from the moisture M is described, but the present invention is not limited thereto. The desalinizing unit 120 may remove sodium and potassium from the moisture M.

The substance S is supplied to the mixing unit 130 from the separating unit 110. Moreover, the desalinized water DSW is supplied to the mixing unit 130 from the desalinizing unit 120. The mixing unit 130 mixes the supplied substance S with the desalinized water DSW. For example, the mixing unit 130 is a stirring tank. The mixing unit 130 mixes the substance S with the desalinized water DSW, and generates the desalinized object DSP.

Hereinafter, operation of the desalinization device 1 will be described with reference to FIG. 3.

Figure 3:
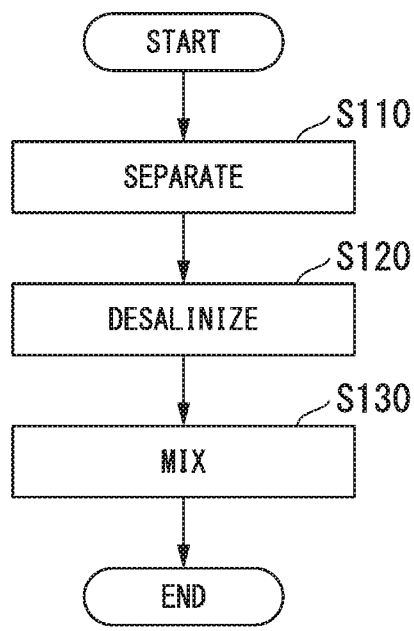
FIG. 3 is a flowchart showing an example of operation of the desalinization device according to the present embodiment.

FIG. 3 is a flowchart showing an example of the operation of the desalinization device 1 according to the present invention.

The separating unit 110 separates the object P into the moisture M which is included in the object P and the substance S other than the moisture M (step S110). The desalinizing unit 120 removes the salinity DS from the moisture M which is separated by the separating unit 110, and generates the desalinized water DSW (step S120). The mixing unit 130 mixes the substance S which is separated by the desalinizing unit 120, with the desalinized water DSW which is generated by the mixing unit 130, and generates the desalinized object DSP (step S130).

As described above, the desalinization device 1 according to the present embodiment generates the desalinized object DSP, by separating the object P into the moisture M and the substance S, and mixing the desalinized water DSW obtained by removing the salinity DS from the moisture M, with the substance S. Thereby, the desalinization device 1 according to the present embodiment generates the desalinized object DSP obtained by removing the salinity DS from the object P.

The desalinization device 1 according to the present embodiment removes the salinity DS only from the moisture M which is included in the object P. That is, the desalinization device 1 according to the present embodiment does not perform ingredient removal processing such as the desalinization processing onto the substance S which is obtained by removing the moisture M from the object P.

Here, if an ingredient such as the salinity DS is removed from object P, even a delicious taste or a flavor may be spoiled. In the desalinization device 1 according to the present embodiment, the ingredient removal processing is not performed onto the substance S in the object P, and the desalinization processing is performed with respect to the moisture M, thereby, it is possible to generate the desalinized object DSP without spoiling the flavor such as the delicious taste which the object P originally has. According to the desalinization device 1 of the present embodiment, it is possible to generate the desalinized object DSP obtained by removing the salinity DS from the object P, without using an additive.

For example, in a case where the salinity which is used at the time of generating a seasoning is reduced, an ingredient (amino acid mineral element) that becomes the delicious taste or the flavor which is generated in accordance with the use of the salinity is also reduced in the seasoning. Therefore, there is a case where in the seasoning, the delicious taste or the flavor is spoiled in comparison with a seasoning in which the salinity is not reduced, and the seasoning is less likely to be used in a cooking process. Specifically, the seasoning may become a flat taste without depth. There is a need to ingest a dish, which is cooked using the seasoning, which is less likely to be felt with the delicious taste or the flavor for an ingesting person who is necessary to ingest a dish of which the salt is reduced by receiving a treatment limiting the salinity.

In the object P of the desalinization device 1 according to the present embodiment, the salinity DS which is the same as that which is used in general is used at a step of generating the object P. Therefore, at the step of generating the object P, the delicious taste or the flavor is not reduced in the object P. In the desalinization device 1 according to the present embodiment, the salinity DS which is the same as that which is used in general is used, and only sodium or potassium is removed among the ingredients that are included in the object P of which the delicious taste or the flavor is not reduced. Thereby, the desalinization device 1 according to the present embodiment is capable of generating the desalinized object DSP of which the ingredient that becomes the delicious taste or the flavor is not spoiled. Accordingly, the ingesting person can ingest a dish, namely, a dish for which the desalinized object DSP obtained by removing the salinity DS, by the desalinization device 1 according to the present embodiment is used, which is capable of being felt with the delicious taste or the flavor which is equivalent to that of the seasoning which is generated without reducing the salinity.

The desalinization device 1 may be configured to further include a moisture adjusting unit that performs adjustment of the moisture included in the desalinized object DSP which is generated by the mixing unit 130, in replacement of the configuration in which the respective units described above are included.

Here, there is a case where the amount of the desalinized water DSW is small between the amount of the moisture M which is included in the object P and the amount of the desalinized water DSW obtained by removing the salinity DS from the moisture M in the desalinizing unit 120. Accordingly, there is a case where the moisture included in the desalinized object DSP obtained by mixing the desalinized water DSW with the substance S, is smaller than the moisture included in the object P. In a case where the amount of the moisture which is included in the object P is different from the amount of the moisture which is included in the desalinized object DSP, texture or feeling may vary between the object P and the desalinized object DSP.

The moisture adjusting unit adjusts the moisture which is included in the desalinized object DSP, based on the moisture M which is included in the object P. Specifically, the moisture adjusting unit adjusts the moisture which is included in the desalinized object DSP, by adding the moisture to the desalinized object DSP, based on the amount of the moisture M that is included in the object P. The moisture adjusting unit may adjust the moisture which is included in the desalinized object DSP, based on a proportion of the moisture M which is included in the object P, in replacement of the configuration in which the amount of the moisture that is included in the desalinized object DSP is adjusted, based on the amount of the moisture M that is included in the object P.

Thereby, the desalinization device 1 according to the present embodiment is capable of generating the desalinized object DSP including the moisture of which the amount is approximately the same as that of the object P. That is, the desalinization device 1 according to the present embodiment is capable of generating the desalinized object DSP having the texture or the feeling that is approximately the same as that of the object P.

The desalinization device 1 may be configured to further include a detecting unit that detects bacteria existing in the desalinized object DSP, in replacement of the configuration in which the respective units described above are included.

A manufacturer who manufactures the desalinized object DSP by using the desalinization device 1 according to the present embodiment can determine whether or not the desalinized object DSP is provided to a consumer of the desalinized object DSP, based on a detection result of the detecting unit. For example, in a case where the detection result of the detecting unit indicates that the bacteria existing in the desalinized object DSP exist more than a predetermined threshold value, food poisoning bacteria may exist in the desalinized object DSP. In this case, the manufacturer who manufactures the desalinized object DSP by using the desalinization device 1 according to the present embodiment can determine whether or not the desalinized object DSP is provided to the consumer, based on the detection result of the detecting unit, and can prevent spread of the food poisoning in advance.

In the above description, a case where the manufacturer who manufactures the desalinized object DSP by using the desalinization device 1 determines whether or not the desalinized object DSP is provided to the consumer based on the detection result of the detecting unit is described, but it is not limited thereto. The desalinization device 1 according to the present embodiment may be configured to further include a determining unit that determines whether or not the desalinized object DSP is provided to the consumer, based on the result of the detecting unit.

The determining unit may determine whether or not the desalinized object DSP is provided to the consumer, based on the detection result of the detecting unit. In this case, in the desalinization device 1 according to the present embodiment, the desalinized object DSP is provided to the consumer, in a case where a determination result of the determining unit indicates that the desalinized object DSP is provided to the consumer.

The desalinization device 1 may be configured to further include a heat sterilization processing unit that heats the desalinized object DSP, and to perform sterilization processing, in replacement of the configuration in which the respective units described above are included.

The heat sterilization processing unit performs the heat sterilization processing for heating the desalinized object DSP, and for sterilizing the bacteria existing in the desalinized object DSP.

According to the desalinization device 1 of the present embodiment, it is possible to prevent propagation of the bacteria existing in the desalinized object DSP.

The desalinization device 1 according to the present embodiment may be configured to further include a packing unit that packs the desalinized object DSP, in replacement of the configuration in which the respective units described above are included.

The respective units which are included in the desalinization device 1 according to the present embodiment may be configured to be integrated, may be configured to be separate from each other, or may be configured such that a portion of the respective units has a separate configuration.

Thereupon, the embodiments of the present invention are described in detail with reference to the drawings, but a specific configuration is not limited to the embodiments, and it is possible to appropriately modify the configuration in the scope without departing from the gist of the present invention. The configurations which are described in the embodiments described above may be combined with each other.

REFERENCE SIGNS LIST

1: desalinization device
110: separating unit
120: desalinizing unit
130: mixing unit
DS: salinity
DSP: desalinized object
DSW: desalinized water
M: moisture
P: object
S: substance

The invention claimed is:
1. A method for producing desalinized food, comprising:
separating food including moisture into moisture and a substance other than the moisture;
generating desalinized water obtained by removing salinity from the moisture separated from the substance other than the moisture;
generating the desalinized food, by mixing the substance other than the moisture with the desalinized water; and
adding moisture to the desalinized food.

* * * * *